No. 772,648. PATENTED OCT. 18, 1904.
T. A. EDISON.
VEHICLE WHEEL.
APPLICATION FILED AUG. 28, 1903.
NO MODEL. 2 SHEETS—SHEET 1.
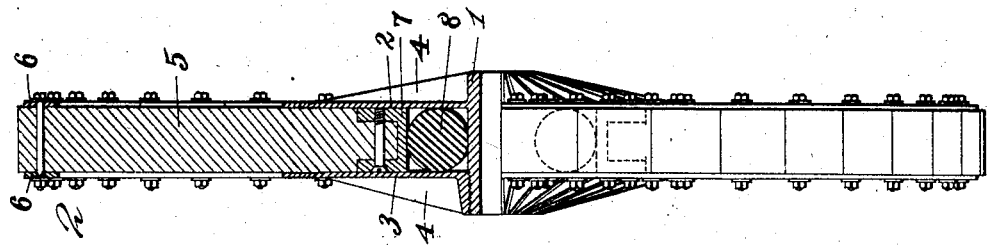
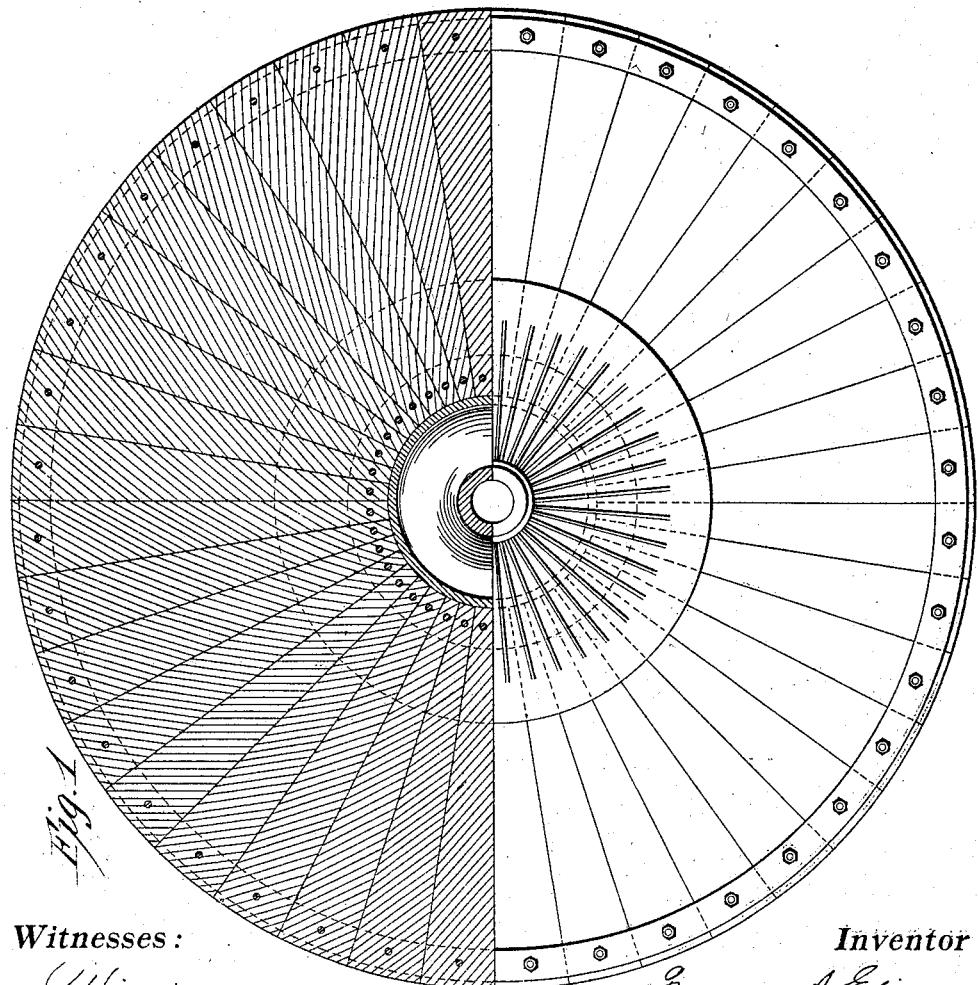
Witnesses:
William A Dolan
John F. Randolph
Inventor
Thomas A Edison
by Frank L. Dyer
Attorney.

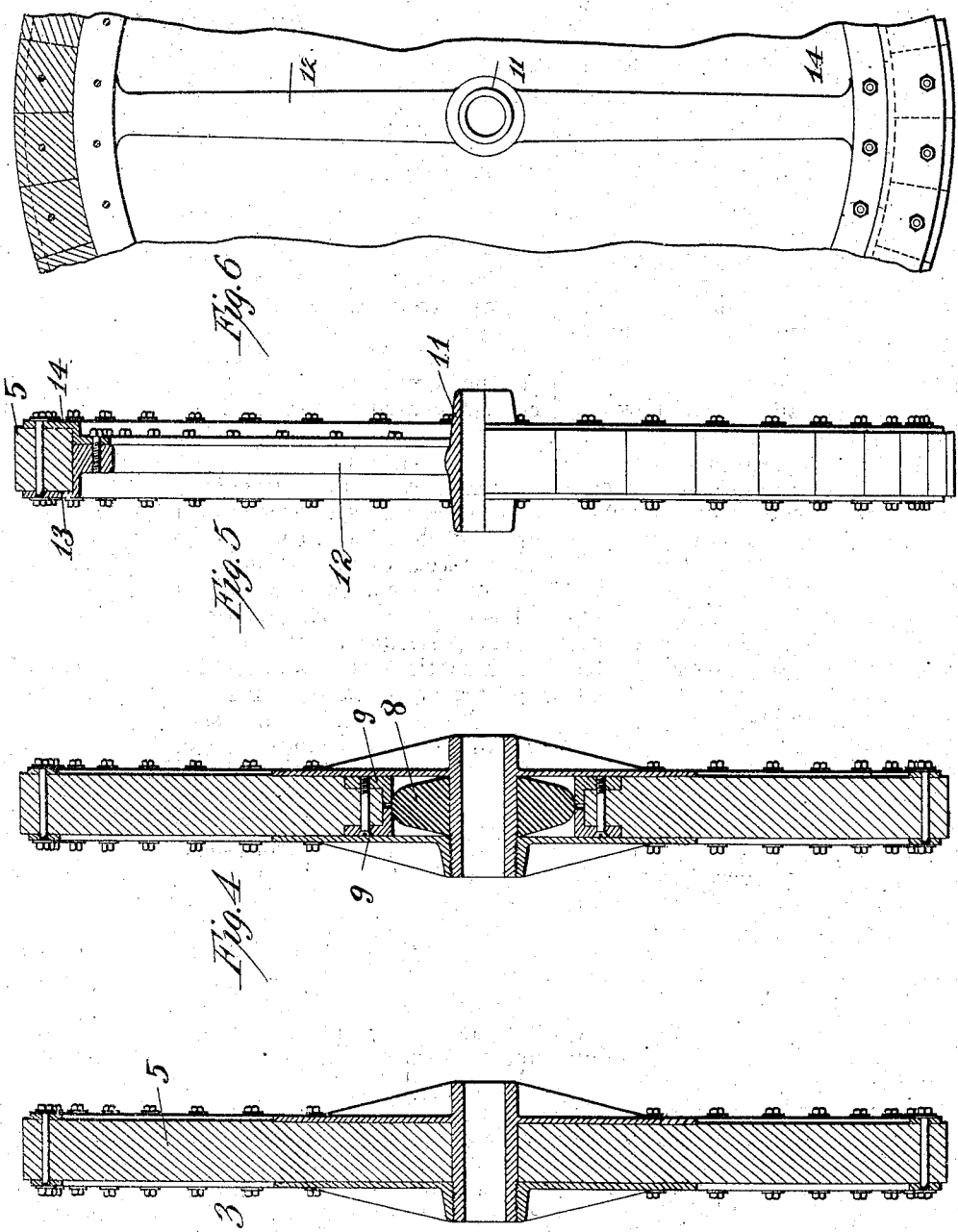

No. 772,648.

Patented October 18, 1904.

UNITED STATES PATENT OFFICE.

THOMAS A. EDISON, OF LLEWELLYN PARK, NEW JERSEY.

VEHICLE-WHEEL.

SPECIFICATION forming part of Letters Patent No. 772,648, dated October 18, 1904.

Application filed August 28, 1903. Serial No. 171,046. (No model.)

*To all whom it may concern:*

Be it known that I, THOMAS A. EDISON, of Llewellyn Park, Orange, in the county of Essex, State of New Jersey, have invented certain Improvements in Vehicle-Wheels, (Case No. 1,111,) of which the following is a description.

My invention relates to various new and useful improvements in vehicle-wheels adapted particularly for automobile-work.

My objects are, first, to provide a wheel having a tread of great durability and wherein slipping is reduced to a minimum; second, to devise a wheel which shall be very resilient, so as to yield and accommodate itself to the small inequalities of the road, and, third, to provide a wheel in which a comparatively small mass requires to be moved or vibrated when small inequalities are encountered, whereby the wheel will be capable of accommodating itself thereto without imposing work on the vehicle-springs.

To this end the invention, generally stated, consists in making a wheel with at least its tread or tire portion formed of sections of endogenous wood—for instance, the palm—arranged so that the fibers shall extend radially of the wheel, or substantially so, and preferably wherein such sections comprise also the main portion of the wheel between its tread and hub.

In its preferred aspect the invention consists of a wheel in the form of a disk built up of sections of endogenous wood suitably secured together and mounted between the flanges of a suitable hub, with an elastic cushion interposed between the disk and the body of said hub, whereby the disk is free to move elastically with respect to the hub, so as to accommodate itself to the small inequalities of the road-surface, as when pneumatic tires are employed. When such an elastic cushion is used, I prefer to make it in the form of a continuous ring of any convenient shape in cross-section and composed of pure vulcanized Para rubber, owing to the extreme resiliency of this material. It becomes possible to use pure rubber in this way, for the reason that it is not subjected to wearing or abrading influences, but is merely displaced or distorted, while at the same time it is substantially protected from harmful atmospheric conditions.

It is not necessary, except in the realization of my invention in its preferred aspect, to make use of an elastic cushion, as explained, since a disk formed of wooden sections of endogenous wood may be bolted or otherwise rigidly secured to the hub, so as to thereby form a rigid non-yielding structure. It is also not necessary to form the wheel of wooden sections extending from the tread or tire to the hub, since such sections may be used for the sole purpose of offering an improved tread or tire for a wheel provided with a channeled rim for receiving such sections, all as I will presently and more fully describe.

The particular point of novelty in my present invention consists in the use in the make-up of a vehicle-wheel of sections of endogenous wood, forming at least the tread or tire of such wheel, and arranged so that the fibers thereof shall extend radially of the wheel, or substantially so. The particular advantage of such an expedient arises from the peculiarity of the physical structure of such wood, it being extremely tough and being formed of substantially parallel fibers bunched closely together and connected by soft intercellular matter. Consequently when used in the make-up of a vehicle-wheel sand and dirt are forced into the wood so as to become tightly packed therein, spreading fibers more or less and forming a somewhat extended and rounded wearing-surface. In this condition the wearing-surface is extremely durable, as it is constantly protected by the packing of sand or dirt which is forced into the same. Moreover, the friction between such a tread and any usual road-surface, even when the latter is muddy, is very great, so that the danger of slipping is greatly reduced, in which respect I obtain a structure possessing a very important advantage over wheels at present equipped with pneumatic tires.

In order that the invention may be better understood, attention is directed to the accompanying drawings, forming a part of this specification, in which—

Figure 1 is a side elevation, partly in section, of a vehicle-wheel embodying my invention in its preferred aspect; Fig. 2, a front view, partly in section, of the same; Fig. 3, a vertical sectional view of a modified form of wheel in which the elastic cushion is omitted; Fig. 4, a similar view illustrating a modified arrangement of elastic cushion from that shown in Figs. 1 and 2; Fig. 5, a front elevation, partly in section, of a further modification, in which the wooden sections are utilized for the tread or tire alone; and Fig. 6 a side elevation, partly in section, of the construction shown in Fig. 5.

In all of the views corresponding parts are represented by the same numerals of reference.

Referring first to Figs. 1 and 2, a hub 1 is formed with an integral flange 2 and with an adjustable flange 3, threaded therein, as shown, both of these flanges being stiffened by radial webs 4 4. The main portion of the wheel is formed of sections 5, composed of some suitable endogenous wood, such as the palm, cut longitudinally, so that the fibers shall extend radially of the wheel, or substantially so. These sections are secured together by rings 6 6, bolted in place near their periphery, and at their inner ends they are mounted within a channel 7, as shown. The sectional disk thus formed is mounted within the flanges 2 and 3 of the hub and is carried on an annular cushion 8, made of some suitable elastic material, preferably pure Para rubber, space being provided, as shown, for the displacement of the latter. The annular cushion 8 may be of any suitable shape in cross-section. In Fig. 2 the cushion is illustrated as being round in cross-section, and in Fig. 4 it is illustrated as having the form of an ordinary solid tire.

The arrangement shown in Fig. 4 is identical with that described except as to the difference in the cross-sectional shape of the annular cushion and also the fact that the channel 7 is made of two sections 9 9, as shown.

In use the annular cushion affords a resilient support for the main portion of the wheel, which therefore is free to vibrate independently of the hub and axle, and thereby accommodate itself to the usual inequalities of the road-surface.

It will be observed that when power for propelling the vehicle is applied to the hub the tire portion of the wheel is driven only through friction between the hub, cushion, and tire portion, respectively. These parts should therefore be assembled as tightly as possible; yet in any case a certain amount of creeping will take place between the hub and cushion and between the cushion and tire portion, since the cushion is so close to the axis of the wheel that the leverage between these parts is very great and would tend to sever any unyielding connection between them. In case a pneumatic cushion were used the valve-stem would be cut off by such creeping action.

In Fig. 3 the annular cushion is dispensed with and the sections 5 are bolted directly to the flanges 2 3 by bolts 10. With the arrangement shown in Figs. 5 and 6 a wheel having a hub 11 and spokes 12 is formed with a sectional rim or channel 13 14, which receives the wooden sections 5, which in this case are much shorter than those previously described, since they constitute only the tread or tire portion. In every instance, however, a wheel embodying my invention will be provided with a tread or tire formed of sections of endogenous wood arranged so that the fibers thereof shall extend radially of the wheel, or substantially so, whereby sand or dirt will be forced between the fibers, so as to displace the intercellular matter to some extent as well as to separate the fibers. The sand or dirt thus embedded into the wheel-tread effectively protects the same against wear and also presents a surface in which slipping will be reduced to a minimum.

Having now described my invention, what I claim as new, and desire to secure by Letters Patent, is as follows:

1. As a new manufacture, a wheel whose tread or tire portion is formed of sections of endogenous wood arranged with the fibers extending radially, or substantially so, as set forth.

2. As a new manufacture, a wheel having a continuous tread or tire portion formed of sections of endogenous wood, arranged with the fibers extending radially, or substantially so, as set forth.

3. A wheel whose tread or tire portion is formed of sections of endogenous wood arranged with the fibers extending radially, or substantially so, and provided with metal protecting-strips secured to said sections adjacent to the wearing-surface thereof on each side, as set forth.

4. In a wheel, the combination with a flanged hub, of a sectional disk mounted in said hub and formed of sections of endogenous wood, arranged with the fibers extending radially, or substantially so, as set forth.

5. In a wheel, the combination with a flanged hub, of a sectional disk mounted in said hub, formed of sections of endogenous wood arranged with the fibers extending radially, or substantially so, and protecting-strips secured to each side of said sections near the wearing-surface thereof, as set forth.

This specification signed and witnessed this 25th day of August, 1903.

THOS. A. EDISON.

Witnesses:
    FRANK L. DYER,
    WILLIAM A. DOLAN.